(12) United States Patent
Chang et al.

(10) Patent No.: US 11,662,918 B2
(45) Date of Patent: May 30, 2023

(54) WIRELESS COMMUNICATION BETWEEN AN INTEGRATED CIRCUIT MEMORY DEVICE AND A WIRELESS CONTROLLER DEVICE

(71) Applicant: FLEXIWORLD TECHNOLOGIES, INC., Vancouver, WA (US)

(72) Inventors: William Ho Chang, Vancouver, WA (US); Vinaynathan Viswanathan, Pune (IN)

(73) Assignee: Flexiworld Technologies, Inc., Vancouver, WA (US)

( * ) Notice: Subject to any disclaimer, the term of this patent is extended or adjusted under 35 U.S.C. 154(b) by 108 days.

(21) Appl. No.: 17/216,469

(22) Filed: Mar. 29, 2021

(65) Prior Publication Data

US 2021/0303180 A1 Sep. 30, 2021

Related U.S. Application Data

(63) Continuation of application No. 16/518,727, filed on Jul. 22, 2019, now Pat. No. 10,963,169, which is a
(Continued)

(51) Int. Cl.
*G06F 21/00* (2013.01)
*G06F 3/06* (2006.01)
(Continued)

(52) U.S. Cl.
CPC .......... *G06F 3/0622* (2013.01); *G06F 3/0656* (2013.01); *G06F 3/0679* (2013.01);
(Continued)

(58) Field of Classification Search
CPC .......... G06F 2213/3814; G06F 13/385; G06F 3/0679; G06F 3/0656; G06F 3/0622;
(Continued)

(56) References Cited

U.S. PATENT DOCUMENTS

| 5,166,809 A | 11/1992 | Surbrook |
| 5,220,674 A | 6/1993 | Morgan et al. |

(Continued)

FOREIGN PATENT DOCUMENTS

| CN | 1345497 A | 4/2002 |
| DE | 19846452 A1 | 12/1999 |

(Continued)

OTHER PUBLICATIONS

Dave Haynie, "The Zorro III Bus Specification: A General Purpose Expansion Bus for High Performance Amiga Computers," Vernal Equinox Release, Mar. 20, 1991, 60 pages.
(Continued)

*Primary Examiner* — Josnel Jeudy
(74) *Attorney, Agent, or Firm* — Chernoff, Vilhauer, McClung & Stenzel, LLP (57) ABSTRACT

An integrated circuit device that includes a secure or protected memory component is herein disclosed and enabled. The integrated circuit device may be a wireless communication device, a smart phone, or a smart card. Additionally, the integrated circuit device may be part of, or included in, a computing device or a mobile device. The integrated circuit device includes a protected memory section for storing protected data that is not accessible by a user at the protected memory section, but is accessible by a memory controller included in the integrated circuit device. The access and transfer of the protected data is protected using combination security operations that may include encryption, cryptography, and user authentication. The integrated circuit device may further include a wireless component for establishing a wireless connection with wireless computing devices or readers for wirelessly transmitting the protected data accessed by the memory controller.

20 Claims, 7 Drawing Sheets

Related U.S. Application Data continuation of application No. 15/042,051, filed on Feb. 11, 2016, now Pat. No. 10,359,957, which is a continuation of application No. 14/835,585, filed on Aug. 25, 2015, which is a continuation of application No. 14/833,961, filed on Aug. 24, 2015, now abandoned, which is a continuation of application No. 14/089,622, filed on Nov. 25, 2013, now Pat. No. 9,116,723, which is a continuation of application No. 12/891,594, filed on Sep. 27, 2010, now Pat. No. 8,595,717, which is a continuation of application No. 10/823,513, filed on Apr. 12, 2004, now Pat. No. 7,805,720, and a continuation-in-part of application No. 10/734,481, filed on Dec. 12, 2003, now Pat. No. 11,467,856.

(60) Provisional application No. 60/462,080, filed on Apr. 11, 2003, provisional application No. 60/433,196, filed on Dec. 12, 2002.

(51) Int. Cl.
  *G06F 13/38* (2006.01)
  *H04M 1/72412* (2021.01)
  *H04W 12/033* (2021.01)
  *H04L 9/40* (2022.01)
  *H04W 12/02* (2009.01)

(52) U.S. Cl.
  CPC ........ *G06F 13/385* (2013.01); *H04L 63/0428* (2013.01); *H04M 1/72412* (2021.01); *H04W 12/02* (2013.01); *H04W 12/033* (2021.01); *G06F 2213/3814* (2013.01)

(58) Field of Classification Search
  CPC ......... H04M 1/72412; H04M 1/72409; H04W 12/02; H04W 12/033; H04L 63/0428
  USPC .......................................................... 726/5
  See application file for complete search history.

(56) References Cited

U.S. PATENT DOCUMENTS

| | | |
|---|---|---|
| 5,287,194 A | 2/1994 | Lobiondo |
| 5,337,258 A | 8/1994 | Dennis |
| 5,404,433 A | 4/1995 | Hosogai |
| 5,412,798 A | 5/1995 | Garney |
| 5,519,641 A | 5/1996 | Beers et al. |
| 5,564,109 A | 10/1996 | Snyder et al. |
| 5,580,177 A | 12/1996 | Gase et al. |
| 5,596,697 A | 1/1997 | Foster et al. |
| 5,604,843 A | 2/1997 | Shaw et al. |
| 5,613,123 A | 3/1997 | Tsang et al. |
| 5,619,250 A | 4/1997 | McClellan et al. |
| 5,619,649 A | 4/1997 | Kovnat et al. |
| 5,699,495 A | 12/1997 | Snipp |
| 5,705,781 A | 1/1998 | Habedank et al. |
| 5,708,780 A | 1/1998 | Levergood et al. |
| 5,761,480 A | 6/1998 | Fukada et al. |
| 5,796,442 A | 8/1998 | Gove et al. |
| 5,815,194 A | 9/1998 | Ueda |
| 5,832,191 A | 11/1998 | Thorne |
| 5,867,633 A | 2/1999 | Taylor, III et al. |
| 5,911,044 A | 6/1999 | Lo et al. |
| 5,926,104 A | 7/1999 | Robinson |
| 5,926,624 A | 7/1999 | Katz et al. |
| 5,933,498 A | 8/1999 | Schneck et al. |
| 5,940,843 A | 8/1999 | Zucknovich et al. |
| 5,974,312 A | 10/1999 | Hayes, Jr. et al. |
| 5,982,520 A | 11/1999 | Weiser et al. |
| 5,987,454 A | 11/1999 | Hobbs |
| 6,009,464 A | 12/1999 | Hamilton |
| 6,020,973 A | 2/2000 | Levine et al. |
| 6,037,981 A | 3/2000 | Wilson et al. |
| 6,043,898 A | 3/2000 | Jacobs |
| 6,044,428 A | 3/2000 | Rayabhari |
| 6,046,820 A | 4/2000 | Konishi |
| 6,061,452 A | 5/2000 | Suzuki |
| 6,070,185 A | 5/2000 | Anupam et al. |
| 6,091,956 A | 7/2000 | Hollenberg |
| 6,119,153 A | 9/2000 | Dujari et al. |
| 6,138,178 A | 10/2000 | Watanabe |
| 6,141,659 A | 10/2000 | Barker et al. |
| 6,148,081 A | 11/2000 | Szymanski et al. |
| 6,148,346 A | 11/2000 | Hanson |
| 6,157,809 A | 12/2000 | Kambayashi |
| 6,167,514 A | 12/2000 | Matsui et al. |
| 6,169,789 B1 | 1/2001 | Rao et al. |
| 6,202,023 B1 | 3/2001 | Hancock et al. |
| 6,205,429 B1 | 3/2001 | Peng |
| 6,216,183 B1 | 4/2001 | Rawlins |
| 6,225,993 B1 | 5/2001 | Lindblad et al. |
| 6,233,611 B1 | 5/2001 | Ludtke et al. |
| 6,246,486 B1 | 6/2001 | Takahashi |
| 6,251,014 B1 | 6/2001 | Stockdale et al. |
| 6,256,666 B1 | 7/2001 | Singhal |
| 6,263,387 B1 | 7/2001 | Chrabaszcz |
| 6,263,392 B1 | 7/2001 | McCauley |
| 6,279,153 B1 | 8/2001 | Bi et al. |
| 6,282,710 B1 | 8/2001 | Boehler |
| 6,285,889 B1 | 9/2001 | Nykänen et al. |
| 6,288,790 B1 | 9/2001 | Yellepeddy et al. |
| 6,324,521 B1 | 11/2001 | Shiota et al. |
| 6,330,611 B1 | 12/2001 | Itoh et al. |
| 6,339,706 B1 | 1/2002 | Tillgren et al. |
| 6,353,928 B1 | 3/2002 | Altberg et al. |
| 6,360,364 B1 | 3/2002 | Chen et al. |
| 6,363,452 B1 | 3/2002 | Lach |
| 6,366,912 B1 | 4/2002 | Wallent et al. |
| 6,366,965 B1 | 4/2002 | Binford et al. |
| 6,366,966 B1 | 4/2002 | Laney et al. |
| 6,370,686 B1 | 4/2002 | Delo et al. |
| 6,379,058 B1 | 4/2002 | Petteruti et al. |
| 6,389,010 B1 | 5/2002 | Kubler et al. |
| 6,389,159 B2 | 5/2002 | Gilman et al. |
| 6,396,531 B1 | 5/2002 | Gerszberg et al. |
| 6,405,362 B1 | 6/2002 | Shih et al. |
| 6,418,439 B1 | 7/2002 | Papierniak et al. |
| 6,418,554 B1 | 7/2002 | Delo et al. |
| 6,421,748 B1 | 7/2002 | Lin et al. |
| 6,426,798 B1 | 7/2002 | Yeung |
| 6,434,535 B1 | 8/2002 | Kupka et al. |
| 6,449,052 B1 | 9/2002 | Sherer et al. |
| 6,452,692 B1 | 9/2002 | Yacoub |
| 6,453,127 B2 | 9/2002 | Wood et al. |
| 6,473,800 B1 | 10/2002 | Jerger et al. |
| 6,477,575 B1 | 11/2002 | Koeppel et al. |
| 6,480,292 B1 | 11/2002 | Sugiyama |
| 6,484,219 B1 | 11/2002 | Dunn et al. |
| 6,487,587 B1 | 11/2002 | Dubey |
| 6,487,599 B1 | 11/2002 | Smith et al. |
| 6,493,104 B1 | 12/2002 | Cromer et al. |
| 6,496,802 B1 | 12/2002 | van Zoest et al. |
| 6,532,368 B1 | 3/2003 | Hild et al. |
| 6,545,722 B1 | 4/2003 | Schultheiss et al. |
| 6,546,387 B1 | 4/2003 | Triggs |
| 6,546,419 B1 | 4/2003 | Humpleman et al. |
| 6,550,008 B1 | 4/2003 | Zhang et al. |
| 6,553,431 B1 | 4/2003 | Yamamoto et al. |
| 6,556,313 B1 | 4/2003 | Chang et al. |
| 6,529,522 B1 | 5/2003 | Ito et al. |
| 6,560,651 B2 | 5/2003 | Katz et al. |
| 6,584,903 B2 | 7/2003 | Jacobs |
| 6,590,588 B2 | 7/2003 | Lincke et al. |
| 6,594,723 B1 | 7/2003 | Chapman et al. |
| 6,600,569 B1 | 7/2003 | Osada et al. |
| 6,601,093 B1 | 7/2003 | Peters |
| 6,603,744 B2 | 8/2003 | Mizutani et al. |
| 6,604,135 B1 | 8/2003 | Rogers et al. |
| 6,604,140 B1 | 8/2003 | Beck et al. |
| 6,607,314 B1 | 8/2003 | McCannon et al. |
| 6,608,928 B1 | 8/2003 | Queiroz |

(56) References Cited

U.S. PATENT DOCUMENTS

| | | |
|---|---|---|
| 6,611,812 B2 | 8/2003 | Hurtado et al. |
| 6,615,404 B1 | 9/2003 | Garfunkel et al. |
| 6,622,018 B1 | 9/2003 | Erekson |
| 6,623,527 B1 | 9/2003 | Hamzy |
| 6,625,472 B1 | 9/2003 | Farazmandnia et al. |
| 6,625,761 B1 | 9/2003 | Sartore et al. |
| 6,628,417 B1 | 9/2003 | Naito et al. |
| 6,633,395 B1 | 10/2003 | Tuchitoi et al. |
| 6,636,929 B1 | 10/2003 | Frantz et al. |
| 6,654,135 B2 | 11/2003 | Mitani |
| 6,658,625 B1 | 12/2003 | Allen |
| 6,662,224 B1 | 12/2003 | Angwin et al. |
| 6,671,068 B1 | 12/2003 | Chang et al. |
| 6,678,751 B1 | 1/2004 | Hays et al. |
| 6,694,371 B1 | 2/2004 | Sanai |
| 6,697,848 B2 | 2/2004 | Hamilton et al. |
| 6,701,009 B1 | 3/2004 | Makoto et al. |
| 6,705,781 B2 | 3/2004 | Iwazaki |
| 6,732,179 B1 | 5/2004 | Brown et al. |
| 6,735,766 B1 | 5/2004 | Chamberlain et al. |
| 6,735,768 B1 | 5/2004 | Tanaka |
| 6,745,229 B1 | 6/2004 | Gobin et al. |
| 6,745,255 B2 | 6/2004 | Yen et al. |
| 6,751,732 B2 | 6/2004 | Strobel et al. |
| 6,753,978 B1 | 6/2004 | Chang |
| 6,757,070 B1 | 6/2004 | Lin et al. |
| 6,757,783 B2 | 6/2004 | Koh |
| 6,760,745 B1 | 7/2004 | Tan et al. |
| 6,772,233 B2 | 8/2004 | Iida et al. |
| 6,785,727 B1 | 8/2004 | Yamazaki |
| 6,788,428 B1 | 9/2004 | Shimokawa |
| 6,798,530 B1 | 9/2004 | Buckley et al. |
| 6,826,632 B1 | 11/2004 | Wugofski |
| 6,829,672 B1 | 12/2004 | Deng et al. |
| 6,830,340 B2 | 12/2004 | Olson et al. |
| 6,839,771 B1 | 1/2005 | Bouchier et al. |
| 6,840,441 B2 | 1/2005 | Monaghan et al. |
| 6,845,398 B1 | 1/2005 | Galensky et al. |
| 6,857,716 B1 | 2/2005 | Nagahashi |
| 6,859,228 B1 | 2/2005 | Chang et al. |
| 6,885,362 B2 | 4/2005 | Suomela |
| 6,889,058 B2 | 5/2005 | Tordera |
| 6,892,230 B1 | 5/2005 | Gu et al. |
| 6,895,444 B1 | 5/2005 | Weisshaar et al. |
| 6,898,652 B2 | 5/2005 | Peters et al. |
| 6,910,068 B2 | 6/2005 | Zintel et al. |
| 6,922,725 B2 | 7/2005 | Lamming et al. |
| 6,941,014 B2 | 9/2005 | Lin et al. |
| 6,944,687 B2 | 9/2005 | Doragh et al. |
| 6,947,995 B2 | 9/2005 | Chang et al. |
| 6,948,165 B1 | 9/2005 | Luu et al. |
| 6,952,831 B1 | 10/2005 | Moore |
| 6,975,644 B1 | 12/2005 | Tordera et al. |
| 7,028,102 B1 | 4/2006 | Larsson et al. |
| 7,047,302 B1 | 5/2006 | Chatani et al. |
| 7,050,840 B2 | 5/2006 | Lin et al. |
| 7,054,296 B1 | 5/2006 | Sorrells et al. |
| 7,055,956 B2 | 6/2006 | Olson et al. |
| 7,055,965 B2 | 6/2006 | Koba |
| 7,069,578 B1 | 6/2006 | Prus et al. |
| 7,076,534 B1 | 7/2006 | Cleron et al. |
| 7,085,814 B1 | 8/2006 | Gandhi et al. |
| 7,099,304 B2 | 8/2006 | Liu et al. |
| 7,102,691 B2 | 9/2006 | Dischert et al. |
| 7,127,541 B2 | 10/2006 | Govindarajulu et al. |
| 7,136,914 B2 | 11/2006 | Motoyama |
| 7,143,408 B2 | 11/2006 | Anderson et al. |
| 7,149,726 B1 | 12/2006 | Lingle et al. |
| 7,149,834 B2 | 12/2006 | Peters et al. |
| 7,158,953 B1 | 1/2007 | DeMello et al. |
| 7,164,885 B2 | 1/2007 | Jonsson et al. |
| 7,174,535 B2 | 2/2007 | Wragge |
| 7,180,475 B2 | 2/2007 | Slobodin et al. |
| 7,230,939 B2 | 6/2007 | Toyoshima |
| 7,237,046 B2 | 6/2007 | Paley et al. |
| 7,239,346 B1 | 7/2007 | Priddy |
| 7,243,153 B2 | 7/2007 | McIntyre et al. |
| 7,260,390 B1 | 8/2007 | Skinner et al. |
| 7,269,668 B2 | 9/2007 | Redford et al. |
| 7,318,086 B2 | 1/2008 | Chang et al. |
| 7,353,416 B2 | 4/2008 | Jeansonne et al. |
| 7,355,732 B2 | 4/2008 | Yamaguchi |
| 7,356,347 B1 | 4/2008 | Kammer |
| 7,370,090 B2 | 5/2008 | Nakaoka et al. |
| 7,484,245 B1 | 1/2009 | Friedman et al. |
| 7,577,910 B1 | 8/2009 | Husemann et al. |
| 7,580,005 B1 | 8/2009 | Palin |
| 7,609,402 B2 | 10/2009 | Chang et al. |
| 7,630,721 B2 | 12/2009 | Ortiz |
| 7,644,018 B1 | 1/2010 | Yukie et al. |
| 7,704,147 B2 | 4/2010 | Quraishi et al. |
| RE41,416 E | 7/2010 | Liu et al. |
| RE41,487 E | 8/2010 | Liu et al. |
| RE41,532 E | 8/2010 | Liu et al. |
| RE41,689 E | 9/2010 | Liu et al. |
| 7,805,720 B2 | 9/2010 | Chang et al. |
| RE41,882 E | 10/2010 | Liu et al. |
| 7,908,401 B2 | 3/2011 | Chang |
| 7,941,541 B2 | 5/2011 | Chang et al. |
| 7,944,577 B2 | 5/2011 | Chang et al. |
| 7,953,818 B2 | 5/2011 | Chang et al. |
| RE42,725 E | 9/2011 | Chang et al. |
| RE42,828 E | 10/2011 | Liu et al. |
| 8,082,491 B1 | 12/2011 | Abdelaziz et al. |
| 8,082,572 B1 | 12/2011 | Tilford |
| RE43,181 E | 2/2012 | Liu et al. |
| 8,169,649 B2 | 5/2012 | Chang et al. |
| 8,184,324 B2 | 5/2012 | Chang et al. |
| 8,285,802 B2 | 10/2012 | Chang et al. |
| 8,296,757 B2 | 10/2012 | Chang et al. |
| 8,332,521 B2 | 12/2012 | Chang et al. |
| 8,533,352 B2 | 9/2013 | Chang |
| 8,595,717 B2 | 11/2013 | Chang et al. |
| 8,630,000 B2 | 1/2014 | Chang et al. |
| 8,705,097 B2 | 4/2014 | Chang et al. |
| 8,711,408 B2 | 4/2014 | Chang et al. |
| 8,812,398 B2 | 8/2014 | Kuhn et al. |
| 8,964,220 B2 | 2/2015 | Chang et al. |
| 8,972,610 B2 | 3/2015 | Chang |
| 8,989,064 B2 | 3/2015 | Chang et al. |
| 9,036,181 B2 | 5/2015 | Chang et al. |
| 9,037,088 B2 | 5/2015 | Chang et al. |
| 9,042,811 B2 | 5/2015 | Chang et al. |
| 9,043,482 B2 | 5/2015 | Chang |
| 9,069,510 B2 | 6/2015 | Chang et al. |
| 9,092,177 B2 | 7/2015 | Chang et al. |
| 9,110,622 B2 | 8/2015 | Chang et al. |
| 9,116,723 B2 | 8/2015 | Chang et al. |
| 9,164,718 B2 | 10/2015 | Chang et al. |
| 9,298,407 B2 | 3/2016 | Chang et al. |
| 9,383,956 B2 | 7/2016 | Chang et al. |
| 9,389,822 B2 | 7/2016 | Chang et al. |
| 9,390,293 B2 * | 7/2016 | Sotos .............. G06F 21/78 |
| 9,798,516 B2 | 10/2017 | Chang et al. |
| RE46,637 E | 12/2017 | Liu et al. |
| 9,836,257 B2 | 12/2017 | Chang et al. |
| 9,836,259 B2 | 12/2017 | Chang et al. |
| 9,841,935 B2 | 12/2017 | Chang et al. |
| 9,965,233 B2 | 5/2018 | Chang et al. |
| 9,971,555 B2 | 5/2018 | Chang et al. |
| 10,037,178 B2 | 7/2018 | Chang et al. |
| 10,126,991 B2 | 11/2018 | Chang et al. |
| 10,133,527 B2 | 11/2018 | Chang et al. |
| 10,140,071 B2 | 11/2018 | Chang et al. |
| 10,140,072 B2 | 11/2018 | Chang et al. |
| 10,140,073 B2 | 11/2018 | Chang et al. |
| 10,152,285 B2 | 12/2018 | Chang et al. |
| 10,162,596 B2 | 12/2018 | Chang et al. |
| 10,261,739 B2 | 4/2019 | Chang et al. |
| 10,303,411 B2 | 5/2019 | Chang et al. |
| 10,346,114 B2 | 7/2019 | Chang et al. |
| 10,359,957 B2 | 7/2019 | Chang et al. |
| 10,387,087 B2 | 8/2019 | Chang et al. |
| 10,481,846 B2 | 11/2019 | Chang et al. |

(56) References Cited

U.S. PATENT DOCUMENTS

| | | |
|---|---|---|
| 10,481,847 B2 | 11/2019 | Chang et al. |
| 10,489,096 B2 | 11/2019 | Chang et al. |
| 10,592,201 B2 | 3/2020 | Chang et al. |
| 10,592,202 B2 | 3/2020 | Chang et al. |
| 10,606,535 B2 | 3/2020 | Chang et al. |
| 10,642,576 B2 | 5/2020 | Chang et al. |
| RE48,066 E | 6/2020 | Liu et al. |
| RE48,088 E | 7/2020 | Liu et al. |
| 10,740,066 B2 | 8/2020 | Chang et al. |
| 10,761,791 B2 | 9/2020 | Chang et al. |
| 10,768,871 B2 | 9/2020 | Chang et al. |
| 10,841,798 B2 | 11/2020 | Chang et al. |
| 10,846,031 B2 | 11/2020 | Chang et al. |
| 10,860,290 B2 | 12/2020 | Chang et al. |
| 10,866,773 B2 | 12/2020 | Chang et al. |
| 10,873,856 B2 | 12/2020 | Chang et al. |
| 10,915,296 B2 | 2/2021 | Chang et al. |
| 10,963,169 B2 | 3/2021 | Chang et al. |
| 11,029,903 B2 | 6/2021 | Chang et al. |
| 11,096,056 B2 | 8/2021 | Chang et al. |
| 11,169,756 B2 | 11/2021 | Chang et al. |
| 11,204,729 B2 | 12/2021 | Chang et al. |
| 11,467,856 B2 | 10/2022 | Chang et al. |
| 2001/0029531 A1 | 10/2001 | Ohta |
| 2001/0032254 A1 | 10/2001 | Hawkins |
| 2002/0002707 A1 | 1/2002 | Ekel et al. |
| 2002/0010756 A1 | 1/2002 | Oku |
| 2002/0012329 A1 | 1/2002 | Atkinson et al. |
| 2002/0013730 A1 | 1/2002 | Bigus |
| 2002/0026492 A1 | 2/2002 | Fujita |
| 2002/0032855 A1 | 3/2002 | Neves et al. |
| 2002/0049580 A1 | 4/2002 | Kutaragi et al. |
| 2002/0051200 A1 | 5/2002 | Chang et al. |
| 2002/0058499 A1 | 5/2002 | Ortiz |
| 2002/0065098 A1 | 5/2002 | Hosogaya |
| 2002/0065872 A1 | 5/2002 | Genske et al. |
| 2002/0078161 A1 | 6/2002 | Cheng |
| 2002/0078367 A1 | 6/2002 | Lang et al. |
| 2002/0081993 A1 | 6/2002 | Toyoshima |
| 2002/0083151 A1 | 6/2002 | Adams et al. |
| 2002/0083430 A1 | 6/2002 | Kusuda et al. |
| 2002/0091843 A1 | 7/2002 | Vaid |
| 2002/0097408 A1 | 7/2002 | Chang et al. |
| 2002/0097415 A1 | 7/2002 | Chang et al. |
| 2002/0097416 A1 | 7/2002 | Chang et al. |
| 2002/0097417 A1 | 7/2002 | Chang et al. |
| 2002/0097418 A1 | 7/2002 | Chang et al. |
| 2002/0097419 A1 | 7/2002 | Chang et al. |
| 2002/0097433 A1 | 7/2002 | Chang et al. |
| 2002/0101515 A1 | 8/2002 | Yoshida et al. |
| 2002/0108054 A1 | 8/2002 | Moore et al. |
| 2002/0145632 A1 | 10/2002 | Shmueli et al. |
| 2002/0147912 A1 | 10/2002 | Shmueli et al. |
| 2002/0169960 A1 | 11/2002 | Iguchi et al. |
| 2002/0174254 A1 | 11/2002 | Kita et al. |
| 2002/0178295 A1 | 11/2002 | Buczek et al. |
| 2003/0028481 A1 | 2/2003 | Flitcroft et al. |
| 2003/0028797 A1 | 2/2003 | Long et al. |
| 2003/0046447 A1 | 3/2003 | Kouperchliak et al. |
| 2003/0084256 A1 | 5/2003 | McKee |
| 2003/0087601 A1 | 5/2003 | Agam et al. |
| 2003/0110371 A1 | 6/2003 | Yang et al. |
| 2003/0110372 A1 | 6/2003 | Proudler |
| 2003/0112975 A1 | 6/2003 | Taiwanese |
| 2003/0120754 A1 | 6/2003 | Muto et al. |
| 2003/0122934 A1 | 7/2003 | Shiohara |
| 2003/0126298 A1 | 7/2003 | Redford et al. |
| 2003/0160993 A1 | 8/2003 | Kang |
| 2003/0161193 A1 | 8/2003 | Moran et al. |
| 2003/0182456 A1 | 9/2003 | Lin et al. |
| 2003/0196007 A1 | 10/2003 | Baron |
| 2003/0200372 A1 | 10/2003 | Doragh et al. |
| 2003/0208629 A1 | 11/2003 | Parkman |
| 2003/0225971 A1 | 12/2003 | Oishi et al. |
| 2004/0001088 A1 | 1/2004 | Stancil et al. |
| 2004/0006648 A9 | 1/2004 | Kita et al. |
| 2004/0015709 A1 | 1/2004 | Chen et al. |
| 2004/0024688 A1 | 2/2004 | Bi et al. |
| 2004/0057075 A1 | 3/2004 | Stewart et al. |
| 2004/0070379 A1 | 4/2004 | Koretsky et al. |
| 2004/0078708 A1 | 4/2004 | Li et al. |
| 2004/0095382 A1 | 5/2004 | Fisher et al. |
| 2004/0127254 A1 | 7/2004 | Chang |
| 2004/0177355 A1 | 9/2004 | Wragge |
| 2004/0193900 A1 | 9/2004 | Nair |
| 2004/0199909 A1 | 10/2004 | Goodman |
| 2004/0203694 A1 | 10/2004 | Wong et al. |
| 2005/0005149 A1 | 1/2005 | Hirota et al. |
| 2005/0005263 A1 | 1/2005 | Miyazaki |
| 2005/0014534 A1 | 1/2005 | Hareng et al. |
| 2005/0055690 A1 | 3/2005 | Cornillon et al. |
| 2005/0059380 A1 | 3/2005 | Tomita |
| 2005/0246436 A1 | 11/2005 | Day et al. |
| 2006/0080517 A1 | 4/2006 | Brown |
| 2006/0112414 A1 | 5/2006 | Ikonen et al. |
| 2006/0173980 A1 | 8/2006 | Kobayashi et al. |
| 2007/0038724 A1 | 2/2007 | Toyoshima |
| 2007/0081486 A1 | 4/2007 | Koide |
| 2007/0240154 A1 | 10/2007 | Gerzymisch et al. |
| 2007/0288611 A1 | 12/2007 | Serceki et al. |
| 2008/0003947 A1 | 1/2008 | Morris |
| 2008/0049740 A1 | 2/2008 | Serceki et al. |
| 2008/0071935 A1 | 3/2008 | Ohta |
| 2008/0126628 A1 | 5/2008 | Mullis et al. |
| 2009/0048978 A1 | 2/2009 | Ginter et al. |
| 2009/0182903 A1 | 7/2009 | Tordera |
| 2009/0198839 A1 | 8/2009 | Banerjee et al. |
| 2009/0210868 A1 | 8/2009 | Parthasarathy |
| 2010/0091800 A1* | 4/2010 | Perkins ............... H04L 65/1101 370/474 |
| 2010/0174631 A1 | 7/2010 | Tian et al. |
| 2010/0201996 A1 | 8/2010 | Chang et al. |
| 2010/0203824 A1 | 8/2010 | Chang et al. |
| 2010/0227550 A1 | 9/2010 | Chang et al. |
| 2011/0016280 A1 | 1/2011 | Chang et al. |
| 2011/0034150 A1 | 2/2011 | Chang et al. |
| 2011/0035682 A1 | 2/2011 | Chang et al. |
| 2011/0138378 A1 | 6/2011 | Chang et al. |
| 2011/0167166 A1 | 7/2011 | Chang |
| 2011/0167175 A1 | 7/2011 | Chang |
| 2011/0211226 A1 | 9/2011 | Chang et al. |
| 2011/0279829 A1 | 11/2011 | Chang et al. |
| 2011/0279863 A1 | 11/2011 | Chang et al. |
| 2012/0096451 A1 | 4/2012 | Tenbarge et al. |
| 2012/0230315 A1 | 9/2012 | Chang et al. |
| 2012/0258700 A1 | 10/2012 | Chang et al. |
| 2013/0095887 A1 | 4/2013 | Chang et al. |
| 2013/0103775 A1 | 4/2013 | Chang et al. |
| 2013/0104052 A1 | 4/2013 | Chang |
| 2013/0109353 A1 | 5/2013 | Chang et al. |
| 2013/0111459 A1 | 5/2013 | Nakamoto |
| 2014/0018130 A1 | 1/2014 | Chang |
| 2014/0082604 A1 | 3/2014 | Chang et al. |
| 2015/0356561 A1 | 12/2015 | Chang et al. |
| 2015/0356564 A1 | 12/2015 | Chang et al. |
| 2015/0356565 A1 | 12/2015 | Chang et al. |
| 2015/0363763 A1 | 12/2015 | Chang et al. |
| 2015/0381612 A1 | 12/2015 | Chang et al. |
| 2016/0011836 A1 | 1/2016 | Chang et al. |
| 2016/0066188 A1* | 3/2016 | McCormack ......... H04W 12/08 726/4 |
| 2016/0174068 A1 | 6/2016 | Chang et al. |
| 2016/0239232 A1 | 8/2016 | Chang et al. |
| 2016/0239243 A1 | 8/2016 | Chang et al. |
| 2016/0313974 A1 | 10/2016 | Chang et al. |
| 2017/0039009 A1 | 2/2017 | Chang et al. |
| 2017/0064746 A1 | 3/2017 | Chang et al. |
| 2017/0075636 A1 | 3/2017 | Chang et al. |
| 2017/0078521 A1 | 3/2017 | Chang et al. |
| 2017/0185376 A1 | 6/2017 | Chang et al. |
| 2017/0228202 A1 | 8/2017 | Chang et al. |
| 2017/0242649 A1 | 8/2017 | Jarvis et al. |
| 2017/0249116 A1 | 8/2017 | Chang et al. |
| 2017/0277487 A1 | 9/2017 | Chang et al. |

(56) References Cited

U.S. PATENT DOCUMENTS

| | | |
|---|---|---|
| 2017/0286027 A1 | 10/2017 | Chang et al. |
| 2017/0364326 A1 | 12/2017 | Chang et al. |
| 2018/0011667 A1 | 1/2018 | Chang et al. |
| 2018/0024790 A1 | 1/2018 | Chang et al. |
| 2018/0024791 A1 | 1/2018 | Chang et al. |
| 2018/0039456 A1 | 2/2018 | Chang et al. |
| 2018/0039459 A1 | 2/2018 | Chang et al. |
| 2018/0041482 A1 | 2/2018 | Chang et al. |
| 2018/0046418 A1 | 2/2018 | Chang et al. |
| 2018/0203647 A1 | 7/2018 | Chang et al. |
| 2018/0203648 A1 | 7/2018 | Chang et al. |
| 2018/0253264 A1 | 9/2018 | Chang et al. |
| 2018/0335989 A1 | 11/2018 | Chang et al. |
| 2018/0364929 A9 | 12/2018 | Chang et al. |
| 2019/0107980 A1 | 4/2019 | Chang et al. |
| 2019/0121585 A1 | 4/2019 | Chang et al. |
| 2019/0121613 A1 | 4/2019 | Chang et al. |
| 2019/0250883 A1 | 8/2019 | Chang et al. |
| 2019/0272148 A1 | 9/2019 | Chang et al. |
| 2019/0303100 A1 | 10/2019 | Chang et al. |
| 2019/0361617 A1 | 11/2019 | Chang et al. |
| 2019/0384547 A1 | 12/2019 | Chang et al. |
| 2020/0097225 A1 | 3/2020 | Chang et al. |
| 2020/0225889 A1 | 7/2020 | Chang et al. |
| 2021/0055891 A1 | 2/2021 | Chang et al. |
| 2021/0165632 A1 | 6/2021 | Chang et al. |
| 2021/0303180 A1 | 9/2021 | Chang et al. |

FOREIGN PATENT DOCUMENTS

| | | |
|---|---|---|
| EP | 0473987 A1 | 3/1992 |
| EP | 1072976 A2 | 1/2001 |
| GB | 2357663 A | 6/2001 |
| WO | 9526703 A1 | 10/1995 |
| WO | 9843433 A1 | 10/1998 |
| WO | 0002358 A1 | 1/2000 |
| WO | 0006904 A1 | 2/2000 |
| WO | 0024192 A1 | 4/2000 |
| WO | 0044119 A1 | 7/2000 |
| WO | 0125870 A2 | 4/2001 |
| WO | 0142894 A1 | 6/2001 |
| WO | 0241118 A2 | 5/2002 |
| WO | 03015641 A1 | 2/2003 |
| WO | 2004093149 A2 | 10/2004 |

OTHER PUBLICATIONS

Herman D'Hooge, "The Communicating PC," IEEE Communications Magazine, Apr. 1996, pp. 36-42.

Wiener et al. "Meeting USB and IEEE1394 overcurrent protection requirements using PolySwitch devices," IEEE Wescon/97 Conference Proceedings, Nov. 1997, pp. 442-475.

Tony K.P. Wong, "An Embedded Chip for USB Application: from the Architecture to the Implementation," International IC '99 Conference Proceedings, 1999, pp. 1-10.

E.V. Vetvitskii et al., "Use of the USB Universal Serial Bus in Computer Medical Systems," Biomedical Engineering, 2000, pp. 167-172, vol. 34, No. 4.

M-Systems, "Mobile DiskOnChip Plus 32/64MByte, Flash Disk with Protection and Security-Enabling Features," 2002, 50 pages.

Ray Geroski, "Take your data anywhere with these four USB miniature storage devices," Sep. 23, 2002, 6 pages.

Ed Roth, "Storage in a Flash," Dec. 15, 2002, 4 pages.

Jon David, "Security in a Flash," 2003, 6 pages.

Jankovec et al., "Analog circuit development system," IEEE, 2003, pp. 125-129.

Terrence B. Remple, "USB On-The-Go Interface for Portable Devices," IEEE, 2003, pp. 8-9.

Attiaoui et al. "Conception of Data Base Management System in USB Smart Card Flash Memory: Application for the Cancer Pathology of Medical Information Systems," SETIT 2005: 3rd International Conference: Sciences of Electronic Technologies of Information and Telecommunications, Mar. 27-31, 2005, pp. 1-7.

Tahir et al., "Analysis of AutoPlay Feature via the USB Flash Drives," Proceedings of the World Conference on Engineering WCE 2008, London, U.K., Jul. 2-4, 2008, pp. 1-4, vol. 1.

Jebarajan et al., "A Method for Designing an Operating System for Plug and Play Bootstrap Loader USB Drive," IJCSI International Journal of Computer Science Issues, Jan. 2001, pp. 295-301, vol. 8, Issue 1.

International Searching Authority, International Search Report in International application No. PCT/US01/48057, dated Jan. 6, 2003, 1 page.

International Preliminary Examination Authority, International Preliminary Examination Report in International application No. PCT/US01/48057, dated Aug. 24, 2004, 11 pages.

International Searching Authority, International Search Report in International application No. PCT/US03/39547, dated Jul. 15, 2005, 4 pages.

International Searching Authority, International Search Report in International application No. PCT/US04/11372, dated Jun. 20, 2007, 3 pages.

The International Bureau of WIPO, International Preliminary Report on Patentability in International application No. PCT/US2004/011372, dated Aug. 14, 2007, 8 pages.

State Intellectual Property Office of the P.R.C., Office action in Chinese Patent Application No. 200480016309.4, dated May 8, 2009, 10 pages.

European Patent Office, Office action in European Patent Application No. 01985549.3, dated Oct. 26, 2010, 4 pages.

State Intellectual Property Office of the P.R.C., Office action in Chinese Patent Application No. 200480016309.4, dated May 24, 2011, 11 pages.

State Intellectual Property Office of the P.R.C., Office action in Chinese Patent Application No. 200480016309.4, dated Oct. 28, 2011, 6 pages.

European Patent Office, Office action in European Patent Application No. 04759486.6, dated Dec. 23, 2011, 11 pages.

State Intellectual Property Office of the P.R.C., Office action in Chinese Patent Application No. 200480016309.4, dated Aug. 5, 2013, 18 pages.

European Patent Office, Office action in European Patent Application No. 04759486.6, dated Jan. 8, 2014, 14 pages.

European Patent Office, Office action in European Patent Application No. 04759486.6, dated Mar. 19, 2014, 3 pages.

State Intellectual Property Office of the P.R.C., Office action in Chinese Patent Application No. 200480016309.4, dated Apr. 3, 2014, 14 pages.

European Patent Office, Office action in European Patent Application No. 04759486.6, dated May 22, 2014, 43 pages.

State Intellectual Property Office of the P.R.C., Decision of Rejection in Chinese Patent Application No. 200480016309.4, dated Sep. 29, 2014, 17 pages.

U.S. Patent and Trademark Office, Office action in U.S. Appl. No. 10/823,513, dated Feb. 8, 2007, 60 pages.

U.S. Patent and Trademark Office, Office action in U.S. Appl. No. 10/823,513, dated Oct. 31, 2007, 26 pages.

U.S. Patent and Trademark Office, Office action in U.S. Appl. No. 10/734,481, dated Mar. 24, 2008, 33 pages.

U.S. Patent and Trademark Office, Office action in U.S. Appl. No. 10/734,484, dated Sep. 2, 2008, 44 pages.

U.S. Patent and Trademark Office, Office action in U.S. Appl. No. 10/823,513, dated Dec. 29, 2008, 28 pages.

U.S. Patent and Trademark Office, Office action in U.S. Appl. No. 10/734,481, dated Jan. 6, 2009, 43 pages.

U.S. Patent and Trademark Office, Office action in U.S. Appl. No. 10/734,481, datd Dec. 8, 2009, 40 pages.

U.S. Patent and Trademark Office, Office action in U.S. Appl. No. 10/823,513, dated Dec. 17, 2009, 32 pages.

U.S. Patent and Trademark Office, Notice of Allowance in U.S. Appl. No. 10/823,513, dated Jun. 1, 2010, 43 pages.

U.S. Patent and Trademark Office, Notice of Allowance in U.S. Appl. No. 10/734,484, dated Oct. 28, 2010, 57 pages.

(56) References Cited

OTHER PUBLICATIONS

U.S. Patent and Trademark Office, Office action in U.S. Appl. No. 10/734,481, dated Aug. 2, 2011, 68 pages.
U.S. Patent and Trademark Office, Office action in U.S. Appl. No. 13/047,672, dated Jan. 20, 2012, 58 pages.
U.S. Patent and Trademark Office, Office action in U.S. Appl. No. 13/047,674, dated Mar. 14, 2012, 38 pages.
U.S. Patent and Trademark Office, Office action in U.S. Appl. No. 10/734,481, dated Apr. 4, 2012, 83 pages.
U.S. Patent and Trademark Office, Notice of Allowance in U.S. Appl. No. 12/890,487, dated Jun. 20, 2012, 10 pages.
U.S. Patent and Trademark Office, Office action in U.S. Appl. No. 12/891,594, dated Jul. 5, 2012, 50 pages.
U.S. Patent and Trademark Office, Notice of Allowance in U.S. Appl. No. 13/047,674, dated Nov. 6, 2012, 21 pages.
U.S. Patent and Trademark Office, Office action in U.S. Appl. No. 13/047,672, dated Nov. 6, 2012, 33 pages.
U.S. Patent and Trademark Office, Office action in U.S. Appl. No. 10/734,481, dated Nov. 7, 2012, 86 pages.
U.S. Patent and Trademark Office, Notice of Allowance in U.S. Appl. No. 12/891,594, dated Jan. 18, 2013, 11 pages.
U.S. Patent and Trademark Office, Notice of Allowance in U.S. Appl. No. 13/047,674, dated Apr. 29, 2013, 15 pages.
U.S. Patent and Trademark Office, Notice of Allowance in U.S. Appl. No. 12/891,594, dated Jul. 22, 2013, 26 pages.
U.S. Patent and Trademark Office, Office action in U.S. Appl. No. 13/047,672, filed Aug. 1, 2013, 25 pages.
U.S. Patent and Trademark Office, Office action in U.S. Appl. No. 10/734,481, dated Sep. 10, 2013, 28 pages.
U.S. Patent and Trademark Office, Office action in U.S. Appl. No. 14/021,974, dated Nov. 22, 2013, 21 pages.
U.S. Patent and Trademark Office, Notice of Allowance in U.S. Appl. No. 13/047,672, dated Dec. 24, 2013, 21 pages.
U.S. Patent and Trademark Office, Office action in U.S. Appl. No. 10/734,481, dated Apr. 3, 2014, 22 pages.
U.S. Patent and Trademark Office, Office action in U.S. Appl. No. 14/021,974, dated May 16, 2014, 47 pages.
U.S. Patent and Trademark Office, Office action in U.S. Appl. No. 13/047,672, dated Jun. 25, 2014, 30 pages.
U.S. Patent and Trademark Office, Notice of Allowance in U.S. Appl. No. 10/734,481, dated Aug. 27, 2014, 23 pages.
U.S. Patent and Trademark Office, Office action in U.S. Appl. No. 14/021,974, dated Sep. 9, 2014, 17 pages.
U.S. Patent and Trademark Office, Office action in U.S. Appl. No. 14/089,622, dated Oct. 6, 2014, 101 pages.
U.S. Patent and Trademark Office, Notice of Allowance in U.S. Appl. No. 13/047,672, dated Oct. 17, 2014, 33 pages.
U.S. Patent and Trademark Office, Notice of Allowance in U.S. Appl. No. 14/021,974, dated Dec. 19, 2014, 24 pages.
U.S. Patent and Trademark Office, Notice of Allowance in U.S. Appl. No. 10/734,481, dated Dec. 23, 2014, 15 pages.
U.S. Patent and Trademark Office, Notice of Allowance in U.S. Appl. No. 14/089,622, dated Mar. 24, 2015, 44 pages.
U.S. Patent and Trademark Office, Notice of Allowance in U.S. Appl. No. 10/734,481, dated Apr. 14, 2015, 18 pages.
U.S. Patent and Trademark Office, Supplemental Notice of Allowability in U.S. Appl. No. 14/089,622, dated Apr. 29, 2015, 16 pages.
U.S. Patent and Trademark Office, Office action in U.S. Appl. No. 10/734,481, filed Aug. 17, 2015, 19 pages.
U.S. Patent and Trademark Office, Office action in U.S. Appl. No. 10/734,481, dated Jan. 28, 2016, 33 pages.
U.S. Patent and Trademark Office, Office Action for U.S. Appl. No. 10/734,481, dated Sep. 28, 2016, 20 pages.
U.S. Patent and Trademark Office, Office Action for U.S. Appl. No. 10/734,481, dated May 15, 2017, 98 pages.
United States Patent and Trademark Office, Office Action for U.S. Appl. No. 15/042,044 dated Mar. 3, 2022, 16 pages.
United States Patent and Trademark Office, Office Action for U.S. Appl. No. 15/042,044 dated Aug. 5, 2022, 17 pages.
United States Patent and Trademark Office, Office Action for U.S. Appl. No. 10/734,481 dated May 29, 2020, 88 pages.
United States Patent and Trademark Office, Notice of Allowance for U.S. Appl. No. 10/734,481 dated Mar. 9, 2022, 2 pages.
United States Patent and Trademark Office, Notice of Allowance for U.S. Appl. No. 10/734,481 dated May 16, 2022, 6 pages.
Office Action issued by the US Patent and Trademark Office for U.S. Appl. No. 15/042,051, dated Dec. 28, 2017, 68 pages.
Office Action issued by the US Patent and Trademark Office for U.S. Appl. No. 15/042,044, dated Jan. 11, 2018, 65 pages.
Office Action issued by the US Patent and Trademark Office for U.S. Appl. No. 10/734,481, dated Feb. 14, 2018, 41 pages.
Office Action issued by the US Patent and Trademark Office for U.S. Appl. No. 15/042,051, dated Sep. 28, 2018, 14 pages.
Office Action issued by the US Patent and Trademark Office for U.S. Appl. No. 10/734,481, dated Feb. 21, 2019, 113 pages.
Notice of Allowance issued by the US Patent and Trademark Office for U.S. Appl. No. 15/042,051, dated Feb. 26, 2019, 68 pages.
Final Office Action issued by the US Patent and Trademark Office for U.S. Appl. No. 10/734,481, dated Oct. 10, 2019, 107 pages.
Office Action prepared by the US Patent and Trademark Office for U.S. Appl. No. 10/734,481, dated May 29, 2020, 93 pages.
Office Action prepared by the US Patent and Trademark Office for U.S. Appl. No. 15/042,044, dated Jul. 20, 2020, 22 pages.
Office Action prepared by the US Patent and Trademark Office for U.S. Appl. No. 15/042,044, dated Jan. 19, 2021, 21 pages.
Office Action prepared by the US Patent and Trademark Office for U.S. Appl. No. 10/734,481, dated Jan. 29, 2021, 31 pages.
Office Action prepared by the US Patent and Trademark Office for U.S. Appl. No. 15/042,044, dated Jun. 24, 2021, 28 pages.
Office Action prepared by the US Patent and Trademark Office for U.S. Appl. No. 16/518,727, dated May 15, 2020, 56 pages.
Notice of Allowance prepared by the US Patent and Trademark Office for U.S. Appl. No. 16/518,727, dated Nov. 6, 2020, 65 pages.
Notice of Allowance prepared by the US Patent and Trademark Office for U.S. Appl. No. 16/518,727, dated Mar. 1, 2021, 9 pages.
Wright, "Design Goals for an Internet Printing Protocol," Apr. 1999, 43 pages.
Kindberg et al., "A Web Based Nomadic Computing System", HP Laboratories, Palo Alto, CA; Aug. 24, 2000, 14 pages.
Bluetooth, Core, "Specification of the Bluetooth System," Dec. 1, 1999, 1080 pages (attachments are in 4 parts).
"Part 11 Wireless LAN Medium Access Control (MAC) and Physical Layer (PHY) Specifications," ANSI/IEEE Std. 802.11, 1999 Edition, 528 pages (split into two documents).
Richard III, Golden G., "Service Advertisement and Discovery: Enabling Universal Device Cooperation" (IEEE Internet Computing Magazine, Sep./Oct. 2000), 9 pages.
Rigney, Steve, Print Servers (PC Magazine, Jan. 19, 1999), 12 pages.
Excerpts from Gerard O'Driscoll, The Essential Guide to Home Networking (Published 2000/ Reprinted 2001), 25 pages.
Axis Print Server Brochure (archived on Sep. 25, 2000, available at https://web.archive.org/web/20000925114525/http:/www.axis.com/ftp/pub/axis/data_sheets/npsds.pdf), 4 pages.
Excerpts from UPnP Forum Connections Newsletter, Third Quarter 2000 (archived on Aug. 16, 2000, available at https://web.archive.org/web/20000816073400/http://upnp.org/newsletter/default.htm, https://web.archive.org/web/20000818105427/http://www.upnp.org/newsletter/devtools.htm), 6 pages.
Excerpts from Bluetooth Core Specification v1.0 B (Dec. 1, 1999), 60 pages.
Excerpts from Roy Hoffman, Data Compression in Digital Systems (1997), 189 pages.
Excerpts from Michael Miller, The Complete Idiot's Guide to Home Theater Systems (2000), 58 pages.
Awduche, Daniel O. "On Resource Discovery Systems with Mobile Hosts" (1996), 6 pages.
IEEE Standard for Information Technology—Transport Independent Printer/System Interface (TIP/SI) (1997), 124 pages.

(56) References Cited

OTHER PUBLICATIONS

Macintosh PowerBook User's Manual (1998), 94 pages.
Setting Up Your PowerBook (2000), 80 pages.

\* cited by examiner

WIRELESS COMMUNICATION BETWEEN AN INTEGRATED CIRCUIT MEMORY DEVICE AND A WIRELESS CONTROLLER DEVICE

CROSS-REFERENCES TO RELATED APPLICATIONS

This application is a continuation of U.S. patent application Ser. No. 16/518,727, filed on Jul. 22, 2019, which is a continuation of U.S. patent application Ser. No. 15/042,051, filed on Feb. 11, 2016, which is a continuation of U.S. patent application Ser. No. 14/835,585, filed on Aug. 25, 2015, which is a continuation of U.S. patent application Ser. No. 14/833,961, filed on Aug. 24, 2015, which is a continuation of U.S. patent application Ser. No. 14/089,622, filed on Nov. 25, 2013, now U.S. Pat. No. 9,116,723, which is a continuation of U.S. patent application Ser. No. 12/891,594, filed on Sep. 27, 2010, now U.S. Pat. No. 8,595,717, which is (1) a continuation of U.S. patent application Ser. No. 10/823,513, filed on Apr. 12, 2004, now U.S. Pat. No. 7,805,720, which claims the benefit of U.S. Provisional Patent Application Ser. No. 60/462,080, filed on Apr. 11, 2003, and (2) a continuation-in-part of U.S. patent application Ser. No. 10/734,481, filed on Dec. 12, 2003, which claims the benefit of U.S. Provisional Patent Application Ser. No. 60/433,196, filed on Dec. 12, 2002. The complete disclosures of the above applications are hereby incorporated by reference for all purposes.

TECHNICAL FIELD

This invention relates to a system and method for utilizing storage media such as flash memory for achieving autorun of an application executable or installer stored on the storage media.

BACKGROUND AND SUMMARY OF THE INVENTION

As is known in the art, some applications such as software installers may be run automatically upon insertion of a CD-ROM disc into a CD-ROM drive, which may sometimes be called a dock or reader. In operation, this automatic running of an application is provided by an autorun feature that is stored on or incorporated into CD-ROM drive dock/reader. Executables or installers stored on the CD-ROM disc are executed by the host personal computer based upon activation by the autorun feature in the CD-ROM drive dock/reader. In this implementation, the autorun feature is incorporated into the hardware drive/dock/reader, which is separate from the storage media.

Universal Serial Bus (USB) technology is rapidly gaining preference as the interfacing technology of choice for peripherals on computing devices such as personal or laptop computers. Flash memories coupled with a USB interface has become a convenient and portable storage device that can replaces floppy disks and compact disks (CDs).

However, the popular and widely-adopted Universal Serial Bus technology does not include distinct autorun features in the docks/readers. As a consequence, conventional integrated circuit memory devices such as USB memory devices do not have autorun functionality.

Accordingly, the present invention provides autorun functionality to any IC memory device, such as any USB peripheral, that has a memory component interfaced to a computing device interface microcontroller. The present invention provides autorun of one or more executables or application installers from a memory component with an interface to a computing device without an intermediate hardware-based autorun feature. As an example, such interface could be a USB interface and such computing device could be a personal computer.

For example, each USB peripheral device internally contains a USB microcontroller that performs the functionality associated with identifying the device to a host computing device, such as a personal computer. In accordance with the present invention, autorun firmware is embedded into the USB microcontroller. The autorun firmware enables autorun of an installable or executable application stored on the memory component of the USB device. The firmware acts as bridge component translating all commands and interactions between a host PC and the memory component.

Additional description and implementations of the present invention will be apparent from the detailed description of the preferred embodiment thereof, which proceeds with reference to the accompanying drawings.

DETAILED DESCRIPTION OF PREFERRED EMBODIMENT

Figure 1:
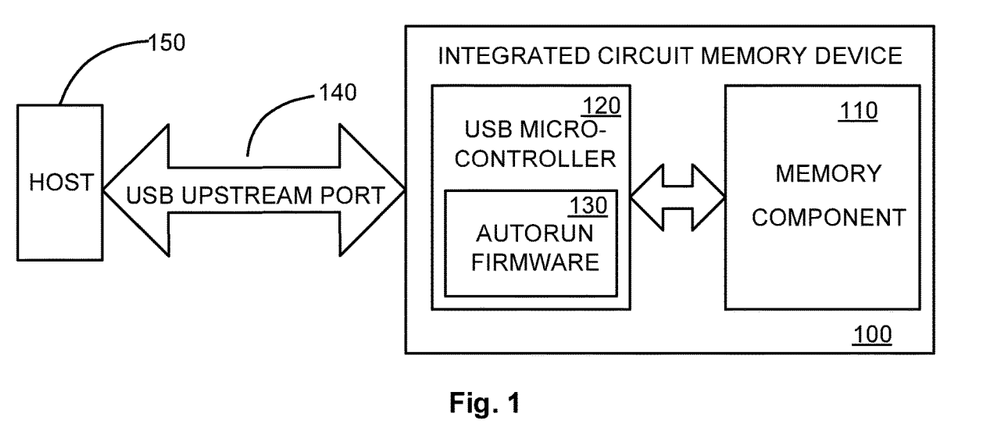
FIG. 1 illustrates an exemplary implementation of an autorun integrated circuit (IC) memory device according to the present invention.

FIG. 1 illustrates an exemplary implementation of an autorun integrated circuit (IC) memory device 100 according to the present invention. Autorun IC memory device may be in the form of a USB memory device, a compact flash card, a smart card, etc. For purposes of illustration, autorun IC memory device 100 will be described with reference to a universal serial bus (USB) memory device implementation.

Autorun IC memory device 100 includes a memory component 110 that communicates with a USB microcontroller 120 having autorun firmware 130 incorporated or embedded into microcontroller 120. Autorun IC memory device 100 includes an upstream port 140 for connecting to a host computing device 150 (e.g., personal or laptop computer, handheld computer, PDA, smart phone, etc., not shown). In the illustrated implementation, upstream port 140 is a USB port.

Autorun firmware 130 causes an application or executable stored in memory component 110 to be installed or run automatically upon activation of the IC memory device 100 vis-à-vis the host computing device 150. This activation may be achieved in a variety of ways including connecting or inserting the autorun IC memory device 100 into a docking system or port present on or interfaced to the host computing device 150. For example, IC memory device 100 with autorun firmware 130 incorporated into USB microcontroller 120 allows a "USB Flash Drive" storing one or more application executables or installables to be run automatically (i.e., autorun) upon activation, such as being plugged into the USB port of a host PC 150.

Figure 2:
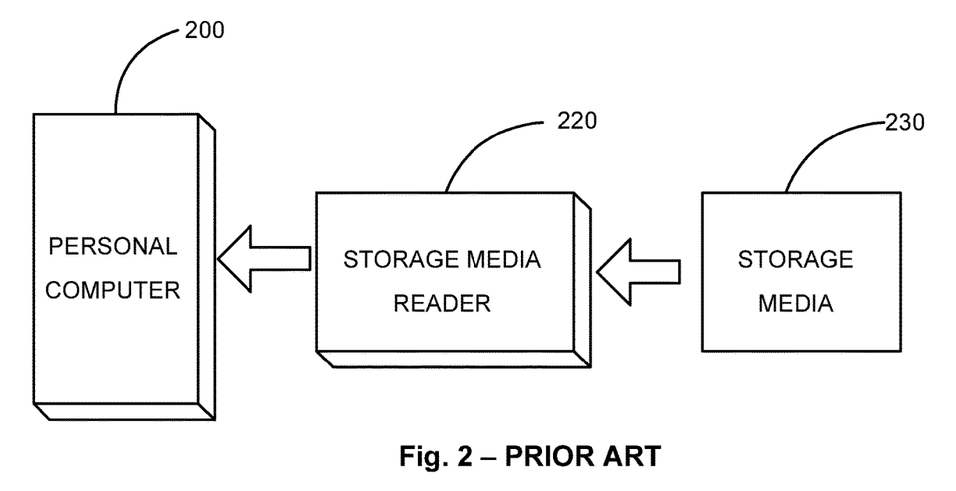
FIG. 2 is a block diagram of a prior art arrangement in which a host personal computer includes an intermediate hardware dock that provides an autorun feature.

FIG. 2 is a block diagram of a prior art arrangement in which a host personal computer 200 includes an intermediate hardware dock 220 that provides an autorun feature for a storage medium like a CD-ROM 230. Intermediate hardware dock 220 functions as a storage media reader that may be internally integrated with or externally connected to the host personal computer 200 and the storage medium 230.

In this prior art implementation, insertion of a CD-ROM disc 230 into a CD-ROM dock/reader 220 may cause activation of an autorun feature that is stored on or incorporated into CD-ROM dock/reader 220. Executables or installers stored on the CD-ROM disc 230 may then be executed by the host personal computer 200 based upon activation by the autorun feature CD-ROM dock/reader 220.

As another example of such a prior art implementation, a flash memory card reader connected to a host computing device, such as a personal computer, may also include an autorun feature that can activate an executable or installer to run on the host computing device.

A disadvantage of such prior art implementations is that autorun features are incorporated into hardware docks or readers that are separate from the storage media. However, the popular and widely-adopted Universal Serial Bus technology does not include such distinct autorun features. As a consequence, conventional integrated circuit memory devices such as USB memory devices do not have autorun functionality. In contrast, the present invention provides autorun functionality to any IC memory device, such as any USB peripheral that has a memory component interfaced to a USB microcontroller.

Figure 3:
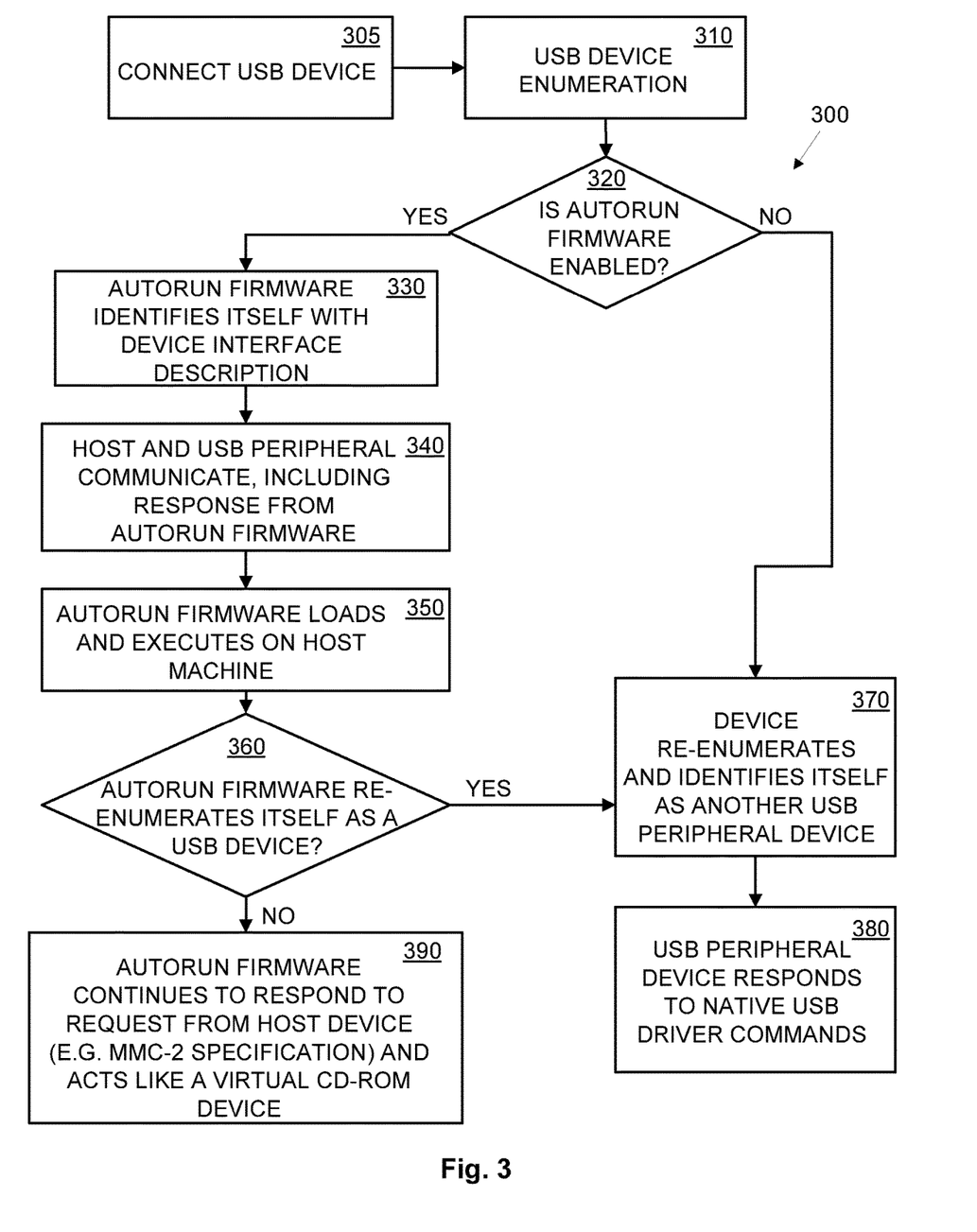
FIG. 3 is a flow diagram of an IC memory device autorun method.

FIG. 3 is a flow diagram of an IC memory device autorun method 300 that may be implemented from firmware 130 incorporated into a USB controller 120.

In step 305, a USB peripheral is inserted into or connected to a USB port of a host computing device (e.g., a personal computer).

In step 310, the host computing device performs an enumeration to identify the newly attached USB peripheral.

Step 320 is a query as to whether the USB peripheral includes autorun firmware that is enabled. If so, step 320 proceeds to step 330. If not, step 320 proceeds to step 370.

In step 330, the autorun firmware in the USB peripheral announces itself with a device interface description. For example, the device interface description may include Mass Storage Class, SCSI transparent command set, Bulk Only Transport corresponding to a CD-ROM, for example.

In step 340, the host and the USB peripheral communicate with each other using, for example a standard MMC-2 specification set. The communication includes a response to host commands from the autorun firmware according to the MMC-2 specification. As a part of the MMC-2 specification, the host requests enumeration of files in root directory and the autorun firmware responds to the request.

In step 350, the autorun firmware informs the host of the presence of an autorun executable file to be executed and provides the file to the host. For example, the file may be named "Autorun.inf," which may be stored on the memory component of the USB peripheral. The host executes the autorun executable file to provide the autorun functionality.

Step 360 is a query whether the autorun firmware is to be enumerated again or "re-enumerated." If so, step 360 proceeds to step 370. If not, step 360 proceeds to step 390. Re-enumeration allows the autorun firmware to announce itself to the host as one or more other USB peripherals (e.g. data storage device, communication adapter, etc.) or, if there is no re-enumeration, the autorun firmware can continue to function as per MMC-2 specifications.

In step 370, the autorun firmware re-enumerates or identifies itself as another USB device, such as a USB flash drive or a USB wireless (e.g., Bluetooth, WiFi, IrDA) device or "dongle." With such a re-enumeration, the autorun firmware identifies itself with device interface descriptors for the other USB devices (e.g., USB flash drive or USB Bluetooth dongle).

In step 380, the autorun firmware loads the firmware associated with the enumerated USB peripheral (e.g., USB flash drive or USB Bluetooth dongle).

In step 390, the autorun firmware is configured to not re-enumerate itself and continues to act as a virtual CD-ROM type device implementing the MMC-2 specifications.

Process steps 320, 330, 340, 350 and 360 correspond to the autorun firmware implementation. Step 390 provides for the implementation of a virtual mass storage device from a memory component that implements SCSI command set and MMC-2 specifications.

Figure 4A:
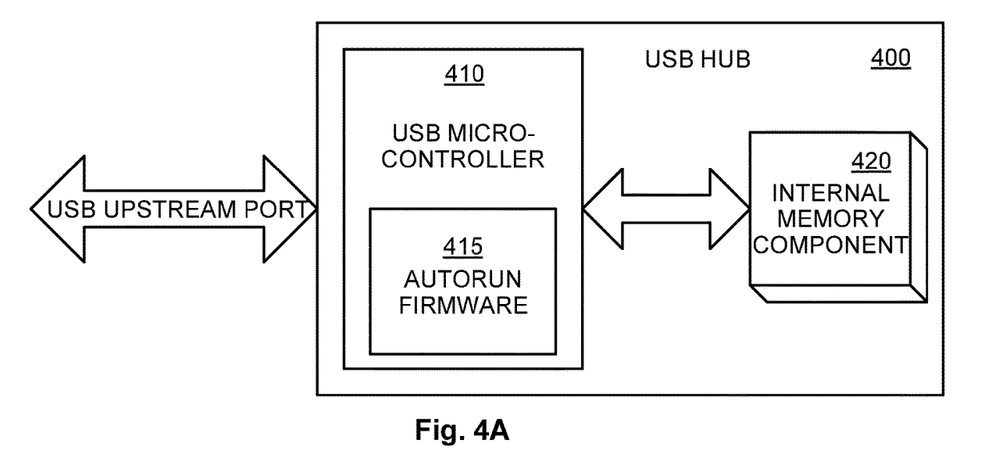
FIGS. 4A and 4B illustrate autorun firmware according to the present invention be embedded into alternative USB device configurations
Figure 4B:
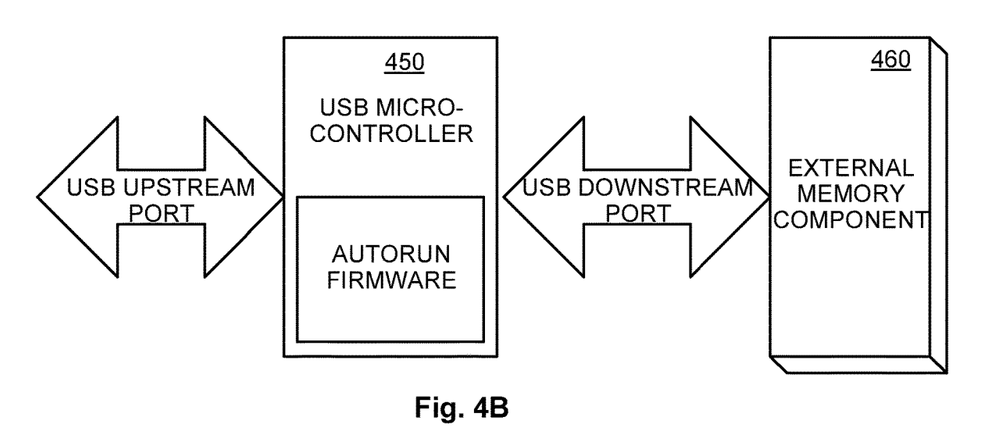

Autorun firmware according to the present invention can be embedded into multiple USB device configurations to provide a variety of unique USB peripherals with autorun functionality and into other peripheral devices with similar functionality. For example, FIG. 4A shows a USB hub 400 in which a USB microcontroller 410 with auto run firmware 415 communicates with an internal memory component 420. In FIG. 4B, a USB microcontroller 450 is connected to an external memory component 460 through a USB downstream port 470.

With reference to FIG. 4A, the USB microcontroller 410 that forms a part of the USB hub 400 typically is a repeater type entity allowing for cascaded multiple USB peripherals to connect through a single upstream port to a host system. The USB microcontroller 410 includes support for programming capability, which includes the autorun firmware 415. The Autorun firmware can then be ported to work on the USB microcontroller 410. The firmware may be stored on the internal memory component 420. Alternatively, the Autorun firmware may be stored on external memory that is in an attached USB memory component 430.

Figure 5:
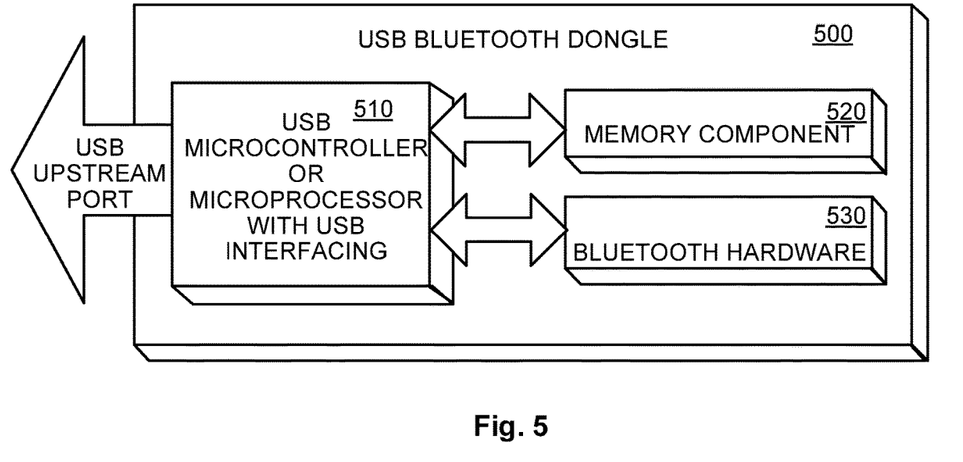
FIG. 5 is a block diagram of a USB peripheral having multiple functionalities.

As another configuration, FIG. 5 is a block diagram of a USB peripheral 500 having multiple functionalities. In this implementation, USB peripheral 500 includes an internal microprocessor with USB interfacing 510, or alternatively a USB microcontroller, that communicates with a memory component 520 and wireless (e.g., Bluetooth) networking hardware 530. As a result, USB peripheral 500 is capable of operating as a wireless (e.g., Bluetooth) networking device or "dongle" and as USB flash drive, both of which are accessible with autorun functionality In one configuration, the microprocessor 510 has USB interfacing ability. It is coupled with a memory component 520 and Bluetooth radio component 530. Microprocessor 510 implements client layers of the Bluetooth stack. The firmware that the microprocessor 510 executes is stored in memory component 520. The autorun firmware can also be additionally stored as a part of the functionality of existing firmware or separately in the memory component 520. In another configuration, the microprocessor 510 may not directly have USB interfacing capability and could use a separate USB microcontroller (not shown).

A feature of including autorun firmware in USB peripherals is that software applications can be bundled with the USB peripherals. The bundled software application may or may not utilize the USB peripheral.

Figure 6:
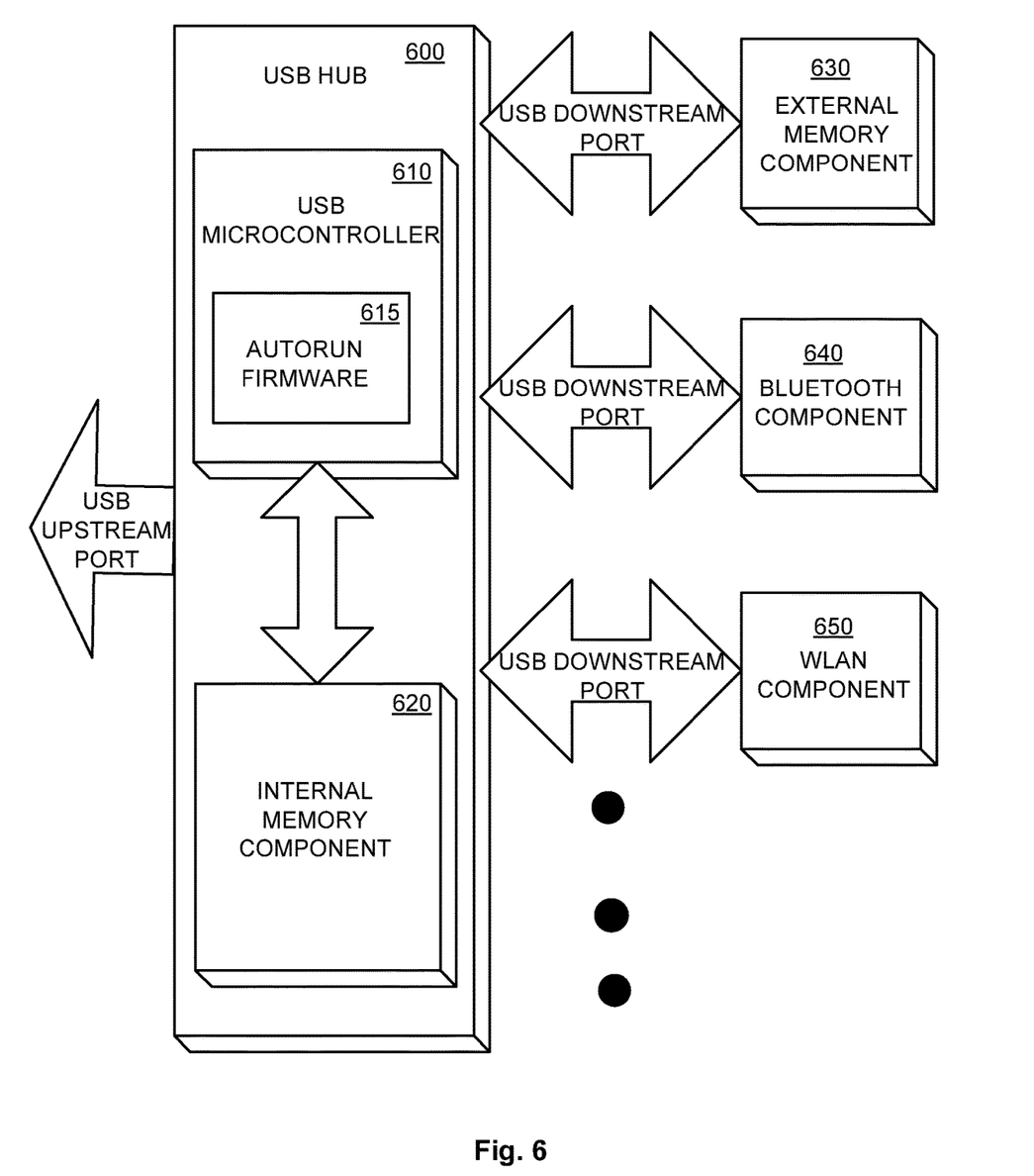
FIG. 6 is a block diagram of a USB hub with autorun firmware and access to multiple distinct functionalities.

As an example, FIG. 6 is a block diagram of a USB hub 600 that includes a USB microcontroller 610 with autorun firmware 615 and access to one or multiple distinct functionalities or USB peripherals, such as an external memory component 630, a Bluetooth networking component 640, or a WLAN component 650. Such USB peripherals 630-650 could be formed in combination with USB hub 600. USB hub 600 may be externally connected with one or more of these components 630-650, as illustrated, or alternatively one or more of the components 630-650 can be internally integrated to form a USB peripheral or device with multiple distinct functionalities.

There could be multiple executions of autorun firmware from each or some of these peripherals. Thus the autorun firmware allows for distribution of software (e.g. device drivers, synchronization software, etc.) that can be autorun along with any USB peripheral.

The implementation options also include mechanisms for allowing the autorun feature to be enabled or disabled by an external mechanism (e.g., switch) that is included on the device or peripheral. The switch could be manually operable by a person. The switch could be a simple two-mode (e.g., autorun on/off) switch or could be a switch that selects from among more than two modes.

Figure 7:
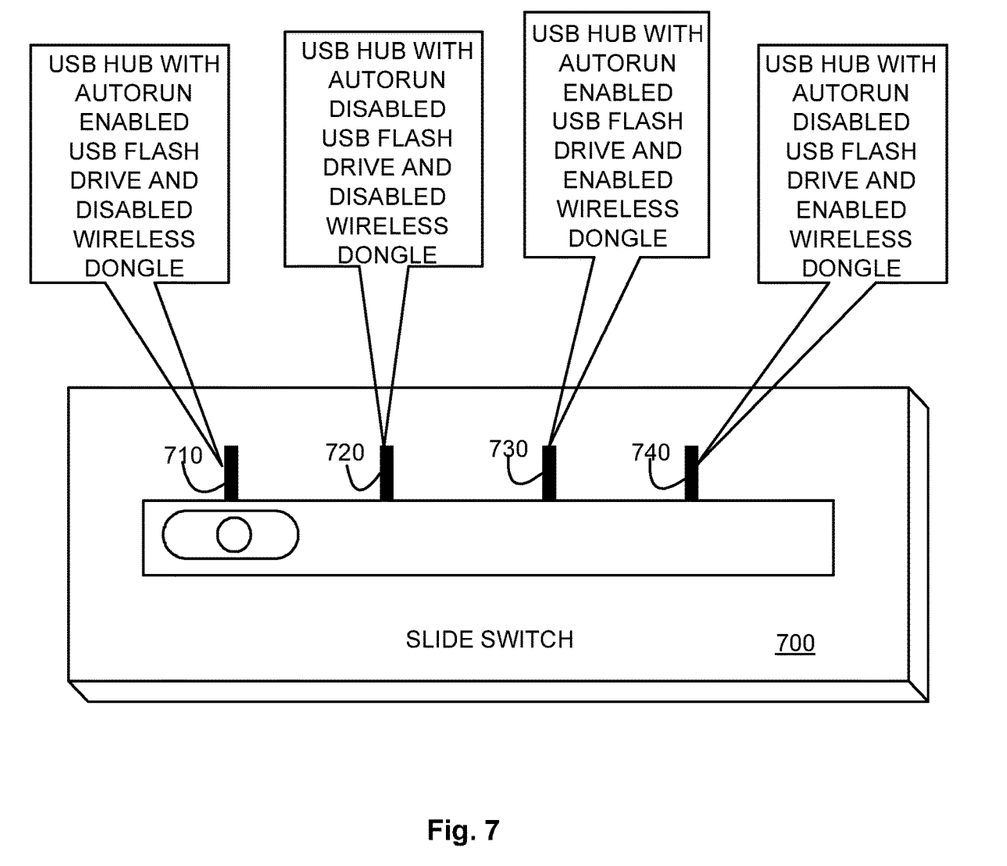
FIG. 7 is a schematic diagram of a person-operable physical slide switch.

FIG. 7 is a schematic diagram of a person-operable physical slide switch 700 that allows a person to select from among multiple modes, functionalities, or peripherals available on a USB device or "dongle." As an example, switch 700 relates to features or peripherals available from USB hub 600 of FIG. 6, including external memory component 630, and wireless dongle or module (640 or 650) for adding wireless (e.g. Bluetooth, WiFi, IrDA) interface to its host PC.

In this exemplary illustration, switch 700 has 4 user-selectable positions. In position 710, autorun functionality is enabled, the wireless component is disabled. In position 720, autorun functionality is disabled, wireless component is disabled. In position 730, autorun functionality is enabled, wireless component is enabled. In position 740, autorun functionality is disabled, wireless component is enabled.

The autorun firmware enables the distribution of software that can be autorun from a memory component. There is also a unique security mechanism that can be incorporated to protect the software that is installable or executable from the memory component by the autorun firmware.

A section of the internal memory component (e.g., memory component 620, FIG. 6) may be protected from public access by password protecting it or by physical security means such as a lock, among other means. The flash memory component can also be segmented into public and private sections. Private sections can be used to store installable or executables that cannot be viewed or accessed by the user, and public sections can be viewed or accessed by users in a conventional manner. The installable or executable software being distributed through the memory component can be stored in the protected region of the memory component. Security by way of copy protection of this installable software can be achieved by allowing only an application launcher executable, which is autorun from the memory component, to access the installable software.

In one implementation, the application launcher executable has the following characteristics: it is autorun from memory component, and it has access to the protected or private region of memory component. This access is gained by authenticating itself to the memory controller (e.g. USB microcontroller) and/or to the installable software in the protected region of the memory component. The authentication mechanism may be a password-based mechanism or a more involved cryptographic algorithm. Among the various techniques used for authentication are digital signatures and unique identifiers like the Bluetooth Device Address, MAC address, etc. The application launcher executable may authenticate itself directly to the memory controller software and/or installable software or to a separate authentication software that resides in the protected region of the memory component.

The application launcher executable may be built generically to execute any or all executables and installables that exist within the protected region of the memory component. Alternatively, the application launcher executable may be programmed to launch a particular executable or installable from the protected region. Considering the possibility of the memory component being segmented into "n" protected sections where n is greater than 1, the application launcher executable may access one or more of these sections in the mechanism described herein. The protected memory region may contain, for example, executable software (also called an application executable), or installable software (also called an application installable), or protected data.

Figure 8:
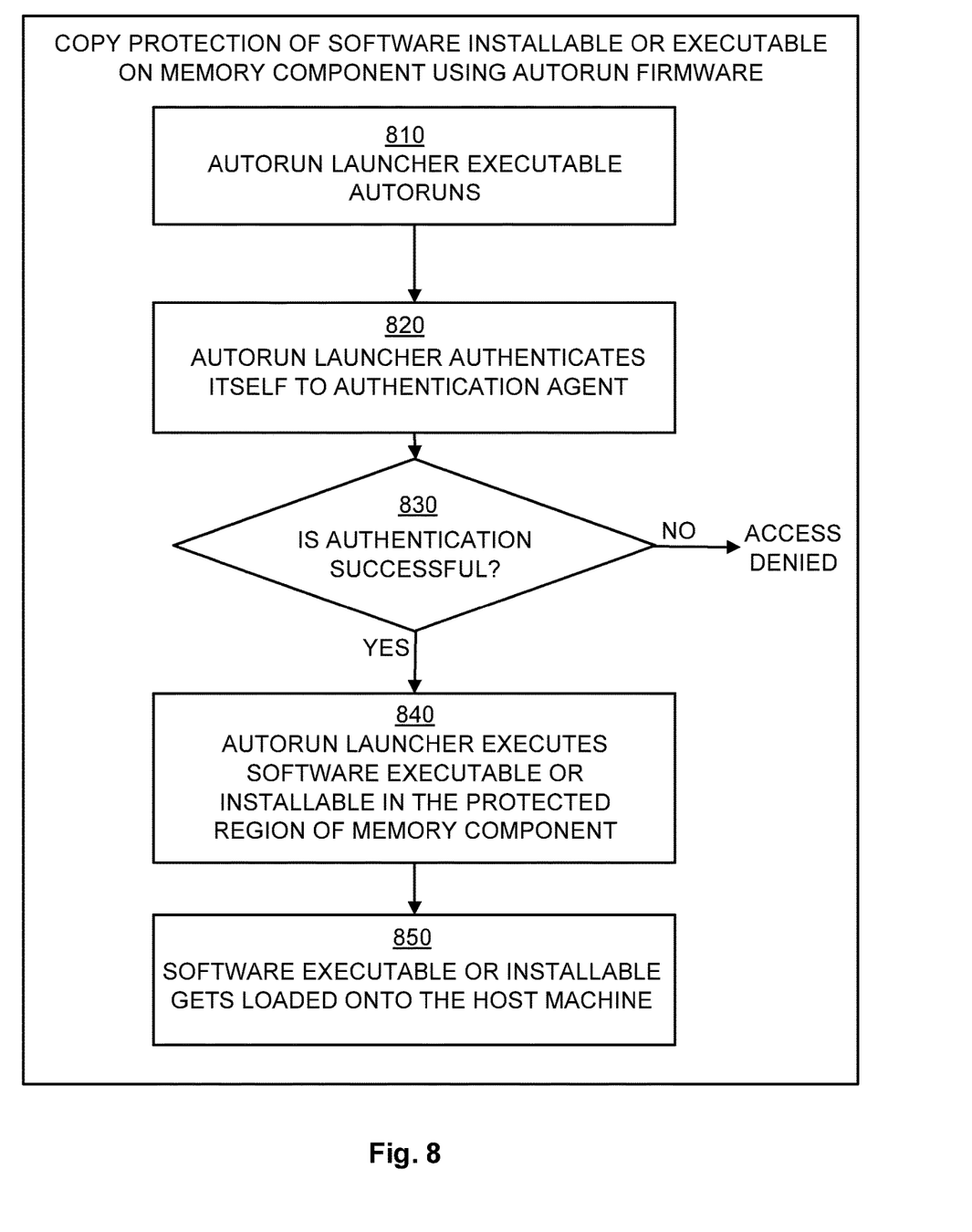
FIG. 8 is a flow diagram of a software-implemented copy protection method.

FIG. 8 is a flow diagram of a software-implemented copy protection method for protecting of software that is executable or installable on using autorun firmware.

In step 810, an application launcher executable that is stored in a memory component of an IC memory device is run automatically on a host computer by an autorun firmware stored on the IC memory device. The autorun firmware is operates automatically upon activation of the IC memory device, such as occurs when the memory device is plugged into a port or socket of the host computer.

In step 820, the application launcher authenticates itself to authentication agent software that resides in the protected region of the memory component. The authentication agent software may be incorporated within the software executable or installable that is being protected or may be a separate application. The authentication algorithm may be password based or may involve cryptographic techniques.

Step 830 is a query whether the authentication is successful. If not, access to the protected executable or installable is denied. If authentication is successful, step 830 proceeds to step 840 and the application launcher executable gains access to the protected memory region.

In step 840, the application launcher executable executes the application executable or installable that is stored in the protected region of the memory component. The application launcher executable may also be programmed to execute any or all executables and installables that exist within the protected region of the memory component.

In step 850, the executables and installables thus launched are executed on the host computer.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An integrated circuit memory device that is a wireless device for wirelessly transmitting protected encrypted data stored in the integrated circuit memory device, the integrated circuit memory device comprising:
   a user interface for interacting with a user;
   a memory controller for executing software or firmware stored at the integrated circuit memory device;
   memory that includes a protected memory area for storing protected data, the protected data stored in the protected memory area is not accessible, from the protected memory area, by the user of the integrated circuit memory device but is accessible by the memory controller; and
   wireless communication circuitry for short range radio frequency wireless communication with wireless controller devices that are within a limited physical distance from the integrated circuit memory device, wherein the integrated circuit memory device is operable to:
   (1) wirelessly discover, over the short range radio frequency wireless communication and using the wireless communication circuitry of the integrated circuit memory device, a wireless controller device that is within a limited physical distance from the integrated circuit memory device;
   (2) establish, using the wireless communication circuitry of the integrated circuit memory device, a short range wireless communication link between the integrated circuit memory device and the wireless controller device that is wirelessly discovered in (1), the short range wireless communication link being a radio communication link;
   (3) wirelessly provide, using the wireless communication circuitry of the integrated circuit memory device and over the short wireless communication link established in (2), from the integrated circuit memory device and to the wireless controller device wirelessly discovered in (1), at least device information for identifying the integrated circuit memory device to the wireless controller device;
   (4) access, using the software or firmware executable by the memory controller of the integrated circuit memory device, the protected data that is stored in the protected memory area, the accessing of the protected data from the protected memory area is based on the memory controller implementing a cryptographic algorithm;
   (5) encrypt, at the integrated circuit memory device, the protected data into encrypted data, the encrypted data is related, at least in part, to the protected data accessed by the memory controller in (4) from the protected memory area of the integrated circuit memory device, the encryption of the data is for wireless transmission of the encrypted data securely over short-range wireless communication from the integrated circuit memory device to the wireless controller device;
   (6) receive, using the user interface of the integrated circuit memory device, and from the user of the integrated circuit memory device, at least a user input for transmitting at least part of the encrypted data encrypted in (5), the user input including at least authentication information related to the user;
   (7) implement an authentication procedure, at and by the integrated circuit memory device, for authentication of the user of the integrated circuit memory device, the authentication procedure includes at least authenticating or interpreting the authentication information related to the user that is received in (6) or implementing cryptography techniques, individually or in any combination, the authentication information related to the user includes at least one or more of biometric information, voice information, or a password, individually or in any combination; and
   (8) wirelessly transmit, using the wireless communication circuitry of the integrated circuit memory device, directly from the integrated circuit memory device securely over the short range wireless communication link established in (2), and to the wireless controller device wirelessly discovered in (1), at least part of the encrypted data encrypted in (5), the wireless transmission of the encrypted data is subsequent to having wirelessly provided the at least device information from the integrated circuit memory device to the wireless controller device in (3) and is based on successful authentication of the user in (7), which includes at least authenticating or interpreting the authentication information related to the user that is received in (6);
   wherein the integrated circuit memory device provides protection of the protected data by storing the protected data in the protected memory area and requiring use of the integrated circuit memory device for wirelessly transmitting the encrypted data securely and directly from the integrated circuit memory device to the wireless controller device in (8).

2. The integrated circuit memory device of claim 1, wherein subsequent to wirelessly transmitting the encrypted data securely and directly from the integrated circuit memory device to the wireless controller device in (8), the integrated circuit memory device is further operable to receive, at the integrated circuit memory device, over the short range wireless communication link established in (2), and from the wireless controller device, status information related to the wireless transmitting of the encrypted data in (8).

3. The integrated circuit memory device of claim 1, wherein the integrated circuit memory device is included in at least one of a smart card, a dongle, a USB memory device, or a wireless communication device.

4. The integrated circuit memory device of claim 3, further comprising a structural interface for connecting the integrated circuit memory device to a reader or a computing device.

5. The integrated circuit memory device of claim 4, wherein the integrated circuit memory device is further configured for transmitting the encrypted protected data from the integrated circuit memory device, over the structural interface and via a structural connection, to the reader or the computing device.

6. The integrated circuit memory device of claim 1, wherein the integrated circuit memory device is included in a smart phone.

7. The integrated circuit memory device of claim 6, wherein the short range radio frequency wireless communication is a local point-to-point wireless communication and the short range wireless communication link established in (2) is a local point-to-point wireless communication connection.

8. A security method for transmitting protected data stored in an integrated circuit memory device to a wireless computing device, the integrated circuit memory device having:
   a wireless communication circuitry for establishing a short range wireless communication connection with the wireless computing device, the short range wireless communication connection being a radio communication connection;

a memory controller;

a memory component;

a protected memory section in the memory component storing the protected data that is implemented to be not accessible by a user of the integrated circuit memory device at the protected memory section, but is implemented to be accessible by the memory controller; and an internal memory area in the memory component storing program or firmware that is implemented to be not accessible by the user of the integrated circuit memory device, but is implemented to be accessible and executable by the memory controller to support at least part of functionalities of the memory controller, the method comprising:

(a) wirelessly discovering, over short range wireless communication and using the wireless communication circuitry of the integrated circuit memory device, the wireless computing device;

(b) establishing, using the wireless communication circuitry of the integrated circuit memory device, a short range wireless communication link between the integrated circuit memory device and the wireless computing device wirelessly discovered in (a), the short range wireless communication link being a radio communication link; and (c) executing, by the memory controller, the program or firmware stored in the internal memory area, and the execution of the program or firmware manages to:

access, using the program or firmware executable by the memory controller of the integrated circuit memory device, the protected data that is stored in the protected memory section;

generate, using the program or firmware executable by the memory controller of the integrated circuit memory device, output data from the protected data that is accessed by the memory controller from the protected memory section of the integrated circuit memory device, the output data being related to the protected data;

encrypt, using the program or firmware executable by the memory controller of the integrated circuit memory device, the generated output data for ensuring security of communication of encrypted output data from the integrated circuit memory device to the wireless computing device, the encrypted output data being related to the protected data;

(d) implementing an authentication procedure, at and by the integrated circuit memory device, for authentication of the user of the integrated circuit memory device, the authentication procedure includes at least authenticating or interpreting authentication information related to the user or implementing cryptography techniques, individually or in any combination, the authentication information related to the user includes at least one or more of biometric information, voice information, or a password, individually or in any combination; and (e) wirelessly transmitting, using the wireless communication circuitry of the integrated circuit memory device, directly from the integrated circuit memory device securely over the short range wireless communication link established in (b), and to the wireless computing device wirelessly discovered in (a), at least part of the encrypted output data encrypted in (c), the wireless transmission of the encrypted output data is subsequent to having implemented the authentication procedure to authenticate the user of the integrated circuit memory device in (d).

9. The method of claim 8, wherein the integrated circuit memory device is included in a mobile phone or a smart phone.

10. The method of claim 8, wherein the method provides protection of the protected data by storing the protected data in the protected memory section of the integrated circuit memory device, by requiring use of the integrated circuit memory device for the wireless transmission of the encrypted output data, by the encryption operation in (c), and by the wireless transmission of the encrypted output data over the short range wireless communication link in (e).

11. The method of claim 9, wherein the method further comprises displaying information, related to the secure wireless transmitting of the encrypted output data in (e), on a graphical user interface provided in the mobile phone or the smart phone, the information displayed includes at least one of payment information or status information, individually or in any combination.

12. The method of claim 10, wherein the protected data includes user payment information, and wherein the encryption of output data includes encrypting, using the program or firmware executable by the memory controller of the integrated circuit memory device, the output data specific to the user payment information.

13. The method of claim 10, wherein the accessing of the protected data from the protected memory section in (c) is based on the memory controller implementing a cryptographic algorithm.

14. The method of claim 13, wherein the method further comprises wirelessly providing, using the wireless communication circuitry of the integrated circuit memory device, from the integrated circuit memory device to the wireless computing device wirelessly discovered in (a), and over the short range wireless communication link established in (b), at least a device descriptor interface, including at least device identification information, for identifying the integrated circuit memory device to the wireless computing device.

15. A wireless communication device that includes an integrated circuit memory device for storing protected data and a wireless communication circuitry for communicating securely with a wireless controller device, the wireless communication device comprising:

the wireless communication circuitry for establishing a local point-to-point wireless communication connection with the wireless controller device, the local point-to-point wireless communication connection being a radio communication connection;

a memory controller;

a protected memory area storing protected data that is implemented to be not accessible by a user of the wireless communication device at the protected memory area, but is implemented to be accessible by the memory controller, the protected data includes data related to user payment information; and an internal memory area storing program or firmware that is implemented to be not accessible by the user of the wireless communication device, but is implemented to be accessible and executable by the memory controller to support at least part of functionalities of the memory controller, wherein operations of the wireless communication device include:

(1) executing, by the memory controller, the program or firmware stored in the internal memory area;

(2) accessing, using the program or firmware executable by the memory controller of the wireless communication device in (1), the protected data that is related to the user payment information, the accessing of the protected data that is related to the user payment information from the protected memory area is based on the memory controller implementing a cryptographic algorithm, and the accessing of the protected data that is related to the user payment information from the protected memory area is subsequent to the execution of the program or firmware by the memory controller in (1);

(3) generating, using the program or firmware executable by the memory controller of the wireless communication device in (1), output data from the protected data that is related to the user payment information and that is accessed by the memory controller from the protected memory area of the wireless communication device in (2), the output data being related to the user payment information;

(4) wirelessly discovering, over short range wireless communication and using the wireless communication circuitry of the wireless communication device, the wireless controller device;

(5) establishing, using the wireless communication circuitry of the wireless communication device, a short range wireless communication link between the wireless communication device and the wireless controller device wirelessly discovered in (4), the short range wireless communication link being a radio communication link;

(6) implementing an authentication procedure, at and by the wireless communication device, for authentication of the user of the wireless communication device, the authentication procedure includes at least authenticating or interpreting authentication information related to the user or implementing cryptography techniques, individually or in any combination, the authentication information related to the user includes at least one or more of biometric information, voice information, or a password, individually or in any combination;

(7) wirelessly providing, using the wireless communication circuitry of the wireless communication device, from the wireless communication device over the short range wireless communication link established in (5), and to the wireless controller device wirelessly discovered in (4), at least device identification information for identifying the wireless communication device to the wireless controller device, the wireless providing of the at least device identification information from the wireless communication device to the wireless controller device is subsequent to the memory controller having executed the program or firmware stored in the internal memory area in (1); and (8) wirelessly transmitting, using the wireless communication circuitry of the wireless communication device, directly from the wireless communication device, securely over the short range wireless communication link established in (5), and to the wireless controller device wirelessly discovered in (4), at least part of the output data generated in (3), the wireless transmission of the output data is subsequent to having wirelessly provided the at least device identification information from the wireless communication device to the wireless controller device in (7) and is based on successful authentication of the user in (6).

16. The wireless communication device of claim 15, wherein the generation of output data in (3) includes encrypting the protected data into the output data, using the program or firmware executable by the memory controller of the wireless communication device in (1), and the encryption of the protected data is specific to the user payment information.

17. The wireless communication device of claim 15, wherein subsequent to wirelessly transmitting of at least part of the output data securely and directly from the wireless communication device to the wireless controller device in (8), operations of the wireless communication device further include receiving, at the wireless communication device, over the short range wireless communication link established in (5), and from the wireless controller device wirelessly discovered in (4), status information related to the secure wireless transmitting of at least part of the output data in (8).

18. The wireless communication device of claim 17, wherein the wireless communication device is further operable to display the status information, related to the secure wireless transmitting of at least part of the output data in (8), on a graphical user interface provided in the wireless communication device.

19. The wireless communication device of claim 18, wherein the wireless communication device is a mobile phone or a smart phone.

20. The wireless communication device of claim 15, wherein the wireless communication device further comprises a structural interface for connecting the wireless communication device to a reader or a computing device, and operations of the wireless communication device further include transmitting at least part of the output data generated in (3) from the wireless communication device, over the structural interface and via a structural connection, to the reader or the computing device.

* * * * *